Nov. 2, 1948. J. W. ROBINS 2,452,956
VALVE
Filed April 3, 1946
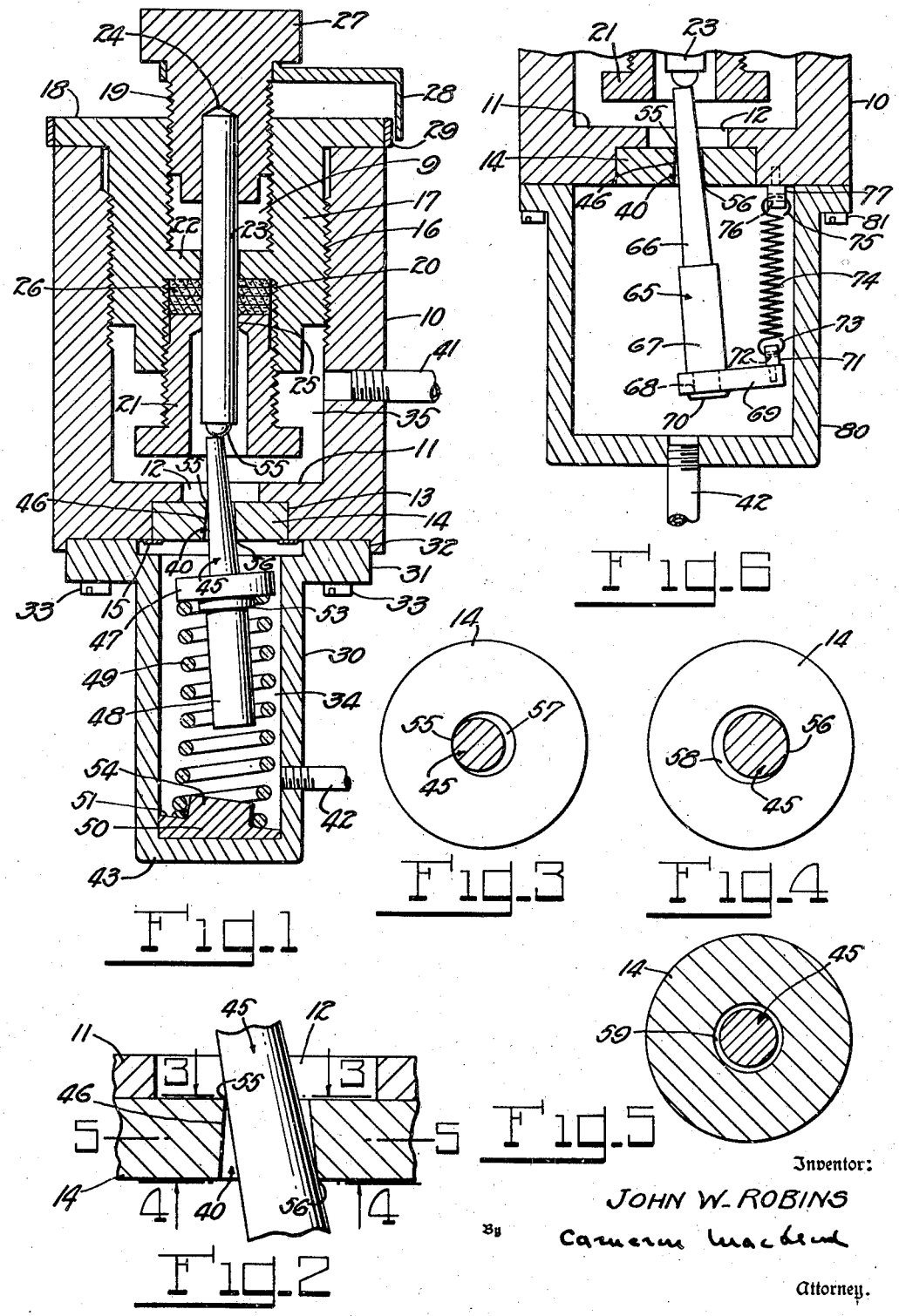
Inventor:
JOHN W. ROBINS
By Cameron Macleod
Attorney.

Patented Nov. 2, 1948

2,452,956

UNITED STATES PATENT OFFICE 2,452,956

VALVE

John W. Robins, Westwood, Mass., assignor to Mason-Neilan Regulator Company, Boston, Mass., a voluntary association of Massachusetts Application April 3, 1946, Serial No. 659,173

10 Claims. (Cl. 251—34)

1

This invention relates to valves, and particularly concerns valves which may be used to graduate microscopic flows of fluid on a basis wherein the rate of fluid flow is substantially directly proportional to the pressure drop across the valve orifice.

Valves to which this invention pertains are provided with a tapered valve plug which extends through an orifice having a corresponding taper, a stem being adapted to engage the tapered end of the plug and to position it in respect to the orifice against the force of a spring or equivalent means by which the valve is normally closed. It will be understood by those skilled in the art that valves of this type may be used for varying the rate of fluid flow substantially in direct proportion to the pressure drop across the valve provided a streamlined or laminar flow is obtained through the orifice. And it will be further understood that laminar flow obtains when the ratio of flow area to orifice length to the pressure drop across the orifice is such that the Reynolds number is below the critical, and that in the valves herein disclosed, the ratio of flow area to orifice length is adapted to provide laminar flow within a selected range of variation in pressure drop across the valve. In this connection it has been found that laminar fluid flow through an orifice passage varies with the shape of the passage since there is a change in the viscous drag and therefore a corresponding change in fluid flow. For this reason, unless the configuration of the flow path remains uniform, the quantity of fluid flowing at a selected valve opening under a given pressure drop tends to vary at repeat valve settings. Thus flow characteristics plotted on a graph in terms of lift and flow at a constant pressure drop and produced by stroking the valve from closed to maximum opening, tend to vary one from another and furthermore, a flow characteristic obtained by opening the valve may not be repeated in the reverse movement as the valve is closed.

I am aware that attempts have been made to maintain a crescent-shaped orifice passage throughout the valve stroke by forcing the tapered end of a valve plug, which is mounted on a helical expansion spring, against the wall of an orifice and rotating the plug around the orifice wall, the object being to cause the plug to engage the orifice wall throughout the orifice length. While this arrangement provides an effective guide for the valve plug at one end of the orifice, it may not insure uniform guiding of the plug at the opposite end of the orifice owing to the inherent lateral instability of the free end of the helical spring on which the valve plug is mounted. Thus changes in flow path configuration tend to occur which may result in corresponding changes in flow at selected valve settings under a given pressure drop.

I have found from repeated tests that accurate results may be obtained by guiding the valve plug against diametrically opposite outer and inner edges, or what may be termed corners, of the orifice. With this construction, the configuration of the flow passage varies from a crescent shape at each end of the orifice to what is substantially an annular shape at the mid portion thereof. By this means the combined configuration of the flow path remains substantially unchanged throughout the valve lift.

Accordingly it is an object of this invention to provide a valve which is capable of accurately varying a rate of fluid flow throughout its range of plug movement.

It is an object of this invention to provide a valve which will effect a desired rate of flow, under a given pressure drop, for each selected valve opening and which will repeat the desired rate of flow for each valve setting throughout the opening and closing valve movement.

More specifically, it is an object of this invention to provide a valve including a tapered plug which extends through an orifice having a corresponding taper, with means for guiding the plug at diametrically opposite points on the orifice wall whereby the configuration of the orifice passage remains substantially unchanged throughout the valve stroke.

These and other objects of this invention and the novel feature thereof will be more clearly understood from the following description when taken in connection with the accompanying drawings; and it will be appreciated that while the valve is adapted for use in connection with an index and appropriate scale for selected valve settings, it may be used in connection with any suitable operating means for graduating fluid flow.

In the drawings:

Fig. 1 is a vertical section of a valve embodying this invention, showing the valve plug at an intermediate opening.

Fig. 2 is an enlarged fragmentary view of the valve plug and orifice member shown in Fig. 1, the relative positions of the parts being somewhat exaggerated for purposes of illustration.

Figs. 3, 4 and 5 are sections taken on lines 3—3, 4—4 and 5—5, respectively, of Fig. 2.

Fig. 6 is a fragmentary view in vertical section showing a modified construction.

Having reference to the drawings, there is shown in Fig. 1 a valve constructed in accordance with this invention. The valve includes a cup-shaped body 10 having a base 11, at one end, with a central bore 12 therethrough, the base being recessed at 13 to receive an orifice member 14 which may be secured thereto as by solder 15. The other end of the body 10 is open and is internally threaded at 16 to receive a correspondingly threaded intermediate 17 which has a suitable flange 18 for making a tight joint with the body. Axially of the intermediate 17, is a bore which is enlarged at 9 and threaded to receive an adjustment screw 19, and is also enlarged at 20 to receive a gland nut 21 of inverted cup shape. Between the enlarged portions 9 and 20 of the bore is a guide portion 22 through which a stem 23 extends and makes a sliding fit therewith. One end of the stem 23 is received within a socket 24 disposed axially of the adjustment screw 19 and the other end of the stem projects into the gland nut 21 through a central opening 25, in the base of the nut, with which it makes a sliding fit, suitable packing 26 being provided to prevent leakage between the parts. As herein shown, the adjustment screw 19 carries a hand knob 27 and an index 28 which cooperates with a scale plate 29 surrounding the edge of the intermediate flange 18 and adapted to indicate the rotary position of the screw 19.

Secured to the base 11 of the valve body is a cup-shaped member 30 which is flanged at 31 and is received within a recess 32 in the base to which it may be detachably connected, as by screws 33. The cup-shaped member 30 defines a chamber 34 at one side of the orifice member 14 and the valve body 10 together with the intermediate 17, gland nut 21 and stem 23 enclose a chamber 35 at the other side of the orifice member. The orifice member 14 has an orifice 40 axially disposed therein which affords fluid communication between the chambers 35 and 34, suitable pipe connections 41 and 42 being provided in the body 10 and the cup-shaped member 30, respectively, to permit fluid to flow to and from the chambers in accordance with the pressure drop across the orifice. It will be understood that the pipe connections 41 and 42 may each communicate with a fluid pressure system, not shown, in which it is desirable to regulate the rate of fluid flow from one portion of the system to the other on a desired basis in proportion to the pressure drop across the orifice 40.

The valve herein illustrated is adapted to graduate microscopic fluid flows on an extremely fine and accurate basis and for this purpose, a valve plug 45 having a very gradual taper is provided. The valve plug extends through the orifice 40, the wall or seating surface 46 of which is correspondingly tapered to provide a tight shutoff, the parts being arranged so that a relatively large increment of valve movement results in a relatively small change in fluid flow. The valve plug 45 is provided with a spring button 47 and a shank 48, the former being supported on a helical expansion spring 49 which surrounds the shank 48 and rests on a spring button 50 disposed on the base 43 of the cup-shaped member 30. The tapered end of the plug 45 is adapted to be engaged by the valve stem 23 which is provided with a hemi-spherical free end 55 so that a ball point contact is obtained between the parts. It will be understood that the tapered plug 45 is held in engagement with the stem 23 by the expansion spring 49 throughout the operating range of the valve, thereby furnishing means for positioning the valve plug at the setting determined by the hand knob 27.

As referred to above, I have found that excellent results can be obtained by providing a fluid flow passage through the orifice 40 which varies from a crescent shape at one end of the orifice to what is substantially an annular shape in the mid-portion thereof and to reverse crescent shape at the other end of said orifice, provided this combined configuration remains substantially unchanged throughout the operating range of valve movement. To this end, I provide means for inclining the axis of the tapered plug 45 to the axis of the orifice 40 when the valve is off its seat, which means are yielding so that the said axes are coincident when the valve is closed and as the valve is opened the angle of divergence gradually increases. For this purpose, as shown in Fig. 1, the spring button 50 is provided with a spring bearing surface 51 which is disposed at an angle to the bottom surface 52 of the button, said last-mentioned surface being normal to the axis of the orifice 40. The spring 49 is centered in the buttons 47 and 52 by the collars 53 and 54, respectively, and by means of the inclined bearing surface 51, the end of the spring which engages the plug button 47 tends to be biased laterally of the orifice axis. Thus the spring provides an axial force for maintaining the plug in the axial position determined by the stem 23 and combines this force with a lateral force which inclines the axis of the tapered plug 45 to the axis of the orifice when the valve is raised from its seat. If desired, the same result may be obtained by inclining the spring bearing surface on the plug button 47 instead of inclining the surface on the lower button 50, or even by inclining one end of the spring itself.

By reference to Figs. 2 to 5, inclusive, it will be noted that the lateral force component causes the tapered plug to engage a corner 55 at one end of the orifice wall 46 and to engage a diametrically opposite corner 56 at the other end of the orifice wall. By this means the plug is guided at substantially fixed points at opposite sides and ends of the orifice from a position just off its seat to a maximum valve opening. Thus substantially the same wall surface is presented to fluid flow and the crescent shaped configuration of the flow path is maintained at the ends of the orifice, as shown at 57 and 58 in Figs. 3 and 4, respectively, and what is substantially an annular shape is maintained at the mid-portion of the orifice, as shown at 59 in Fig. 5. By means of the construction just described, selected settings may be repeated with uniform results under the same conditions of pressure drop, and a fluid flow characteristic produced in opening the valve throughout its operating range is substantially repeated in the reverse movement as the valve is closed.

Referring to Fig. 6, I have shown a modified construction embodying this invention. The valve body 10, orifice member 14, valve stem 23 and associated parts are identical with the construction shown in Fig. 1. However, I provide a valve plug 65 and valve actuating and biasing means of a somewhat different construction. The plug has a tapered portion 66, similar to the corresponding portion of the valve plug 45 described above, and preferably integral therewith is a shank portion 67 which is reduced at 68 and extends through a suitable opening in an arm 69 near one end thereof, said reduced portion being headed over at 70 to provide a rigid connection for the parts. The free end of the arm 69 has threaded thereto a spring connector 71 having a transverse opening 72 to receive a hook-shaped end 73 of an extension spring 74. The other end of the extension spring 74 is also formed in the shape of a hook, as shown at 75, which cooperates with a transverse bore 76 in a connector 77 threaded to the base 11 of the body. The arm 69 operates as a lever, the length of which may be determined to suit the characteristics of the extension spring 74. A suitable housing for the parts may be in the form of a flanged cup-shaped member 80 which may be secured to the base 11 of the body, as by screws 81, the pipe 42 being connected with the housing to serve as a means of fluid communication therewith. By means of this construction, a combined axial and lateral force is produced by which the valve plug 65 is caused to move with the stem 23 and at the same time the plug axis is inclined to the orifice axis as the valve opens so that the tapered plug portion 66 is guided at the diametrically opposite corners 55 and 56, at the ends of the orifice wall 46, in the same manner as described above in connection with the construction shown in Fig. 1.

Having herein described my invention, what I claim as new, and desire to secure by Letters Patent, is:

1. In a valve for varying fluid flow, comprising a body having a fluid chamber, an orifice and a fluid connection communicating with said chamber, the combination with a tapered valve plug extending through the orifice to cooperate therewith, and inclined to said orifice to make contact with opposite sides and ends thereof, of means for moving said plug axially of said orifice and for guiding said plug against the said opposite sides and ends of the orifice throughout the said movement.

2. In a valve for varying fluid flow, comprising a body having a fluid chamber, an orifice and a fluid connection communicating with said chamber, the combination with a tapered valve plug extending through the orifice to cooperate therewith, and means for moving said plug axially in respect thereto, of yielding means for inclining the plug into engagement with opposite sides and ends of said orifice throughout the range of axial plug movement.

3. In a valve for varying fluid flow, comprising a body having a fluid chamber, an orifice and a fluid connection communicating with said chamber, the combination with a valve plug extending through the orifice to vary fluid flow therethrough, a spring for moving said plug axially of said orifice, and a movable stem engaging said plug for positioning it in respect to said orifice against the force exerted by said spring, of means associated with said spring for inclining said plug into engagement with opposite sides of said orifice when positioned axially thereof by said stem.

4. In a valve for varying fluid flow, comprising a body having a fluid chamber, an orifice and a fluid connection communicating with said chamber, the combination with a tapered valve plug extending through said orifice to cooperate therewith, and a stem for engaging said plug and imparting axial movement thereto, of resilient means for moving said plug axially of said orifice in engagement with said stem and laterally of said orifice in engagement with opposite sides and ends thereof.

5. In a valve for varying fluid flow, comprising a body having a fluid chamber, an orifice and a fluid connection communicating with said chamber, the combination with a tapered valve plug extending through said orifice to cooperate therewith, and a stem for engaging one end of said plug to position said plug axially in respect to said orifice, of a spring engaging the other end of said plug for maintaining said plug in engagement with said stem, and means for biasing said spring laterally of said orifice to incline said plug into engagement with opposite sides and ends thereof.

6. In a valve for varying fluid flow including a control orifice and a tapered plug extending through said orifice and cooperating therewith, a spring in operative connection with said plug for moving it in a direction to close said valve, a stem engaging said plug for moving it in a direction to open said valve, and means supporting said spring for biasing it laterally of said orifice to incline said plug into engagement with opposite sides and ends of said orifice while maintaining it is engagement with said stem.

7. In a valve for controlling fluid flow, a valve body having a passage therethrough, a partition across said passage having an orifice therethrough defining a tapered valve seat, a correspondingly tapered valve plug extending through said orifice, a stem at one side of said partition adjustable axially of said orifice, a compression spring at the other side of said partition urging said valve plug into engagement with said stem, and means for biasing said spring laterally of said orifice to incline said plug into engagement with opposite sides and ends of said tapered valve seat.

8. In a valve for varying fluid flow including a control orifice, and a tapered valve plug extending through said orifice and cooperating therewith, a spring engaging said plug for moving it in a direction to close said valve, a stem engaging said plug for moving it in a direction to open said valve, and means engaging said spring for biasing it laterally of said orifice to incline said plug into engagement with opposite sides and ends of said orifice while maintaining it in engagement with said stem.

9. In a valve for controlling fluid flow, a valve body having a passage therethrough, a partition across said passage having an orifice therethrough defining a tapered valve seat, a tapered valve plug extending through said orifice and cooperating therewith, an adjustable stem at one side of said partition for engaging said plug and positioning it axially of said orifice, a compression spring at the other side of said partition engaging said plug and urging said plug into engagement with said stem, said plug having a spring bearing surface, a spring supporting member having a spring bearing surface, said compression spring being disposed between said surfaces and having end surfaces in engagement therewith, one of said surfaces being inclined at an angle to a plane normal to the axis of said orifice to bias said spring laterally thereto and incline said plug into engagement with opposite sides and ends of said valve seat.

10. In a valve for varying fluid flow including a control orifice and a tapered valve plug extending through said orifice and cooperating therewith, a stem for engaging said plug to move it axially in one direction, and spring means for moving said plug in the opposite direction axially of said orifice in engagement with said stem and additionally in a direction laterally to said orifice to incline said plug into engagement with opposite sides and ends of said orifice, said spring means comprising an arm secured to said plug and extending to one side thereof, a fixed support, and a spring connected with said arm and said fixed support.

JOHN W. ROBINS.

REFERENCES CITED

The following references are of record in the file of this patent:

UNITED STATES PATENTS

| Number | Name | Date |
| --- | --- | --- |
| 2,230,093 | Tate | Jan. 28, 1941 |